(12) United States Patent
Morrow et al.

(10) Patent No.: US 10,879,723 B2
(45) Date of Patent: Dec. 29, 2020

(54) EXCHANGEABLE INTERFACE CHARGING DOCK

(71) Applicant: Xentris Wireless LLC, Addison, IL (US)

(72) Inventors: Terrell Morrow, Woodridge, IL (US); Norikiyo I. Honda, Schaumburg, IL (US)

(73) Assignee: Xentris Wireless LLC, Addison, IL (US)

( * ) Notice: Subject to any disclaimer, the term of this patent is extended or adjusted under 35 U.S.C. 154(b) by 149 days.

(21) Appl. No.: 16/378,760

(22) Filed: Apr. 9, 2019

(65) Prior Publication Data

US 2020/0185952 A1 Jun. 11, 2020

Related U.S. Application Data

(60) Provisional application No. 62/777,387, filed on Dec. 10, 2018.

(51) Int. Cl.
| | |
|---|---|
| *H01M 10/46* | (2006.01) |
| *H02J 7/02* | (2016.01) |
| *H02J 7/00* | (2006.01) |
| *H02J 50/00* | (2016.01) |

(52) U.S. Cl.
CPC ............ *H02J 7/025* (2013.01); *H02J 7/0027* (2013.01); *H02J 7/0042* (2013.01); *H02J 7/027* (2013.01); *H02J 50/005* (2020.01)

(58) Field of Classification Search
CPC ...... H02J 7/0042; H02J 7/0047; H02J 7/0027; H02J 7/025; H02J 7/0021; H02J 50/10; H02J 50/005; H02J 50/402; G04G 19/00

USPC .................. 320/107, 108, 114, 115; 968/503
See application file for complete search history.

(56) References Cited

U.S. PATENT DOCUMENTS

| | | | | |
|---|---|---|---|---|
| 8,335,545 | B2* | 12/2012 | Ham | G11B 31/02 |
| | | | | 455/573 |
| 9,320,378 | B2* | 4/2016 | Phipps | B43M 99/001 |
| 2011/0234154 | A1 | 9/2011 | Navid | |
| 2017/0093200 | A1 | 3/2017 | Green | |
| 2018/0138726 | A1 | 5/2018 | Harguth et al. | |
| 2018/0153317 | A1* | 6/2018 | Haroush | A47F 7/024 |
| 2019/0305567 | A1* | 10/2019 | Keeley | H02J 7/0027 |

OTHER PUBLICATIONS

Yeonkyung Kim; International Search Report Written Opinion for counterpart PCT Application PCT/US2019/064094, dated Mar. 20, 2020, KIPO, Daejeon, Republic of Korea.

* cited by examiner

*Primary Examiner* — Edward Tso
(74) *Attorney, Agent, or Firm* — Babcock IP, PLLC

(57) ABSTRACT

A wireless charging dock has a charging element with a first side and a second side; The first side provided with a wireless charge coil and the second side provided with a wireless charge cavity and a cable groove, the wireless charge cavity and the cable groove dimensioned to receive a wireless charger disc and a charge disc cable therein, respectively. The charging element rotatable between a first position in which the first side is oriented to receive a first type of electronic device for wireless charging and a second position in which the second side is oriented to receive a second type of electronic device for wireless charging.

20 Claims, 11 Drawing Sheets

EXCHANGEABLE INTERFACE CHARGING DOCK

CROSS-REFERENCE TO RELATED APPLICATION

This application claims the benefit of U.S. Provisional Application No. 62/777,387 filed on 10 Dec. 2018, hereby incorporated by reference in its entirety.

BACKGROUND

Field of the Invention

This invention relates to wireless charging docks for portable electronic devices. More particularly, the invention relates to a wireless charging dock with an interface exchangeable between two different wireless charging interfaces/protocols.

Description of Related Art

Increasing operating speed, functionality and operating periods of modern consumer electronics devices requires a corresponding increase in electronic device battery power capacity. A significant factor in consumer satisfaction with consumer electronics devices is ease of recharging the battery of the consumer electronics devices. Wireless magnetic inductive charging technologies enable recharging of suitably configured electronics devices without requiring mechanical interconnection via an electrical connector, significantly simplifying recharging procedures and enabling simplified/improved environmental sealing of the electronic devices.

Another problem with electronic device recharging that consumers encounter is managing a proliferation of separate cables and having enough wall plugs available for each of the different chargers that may be in use, for example to enable overnight recharge of each of the consumer's electronic devices, simultaneously.

The consumer electronics market for smart phones and smart watches is dominated by Android and Apple devices. Although both Android and Apple smart phones configured for wireless magnetic inductive charging utilizing the QI wireless magnetic induction charging standard are available, current generations of Android and Apple smart watches require different wireless magnetic inductive charging interfaces.

Therefore, an object of the invention is to provide wireless charger dock solutions that overcome deficiencies in the prior art.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Figure 1:
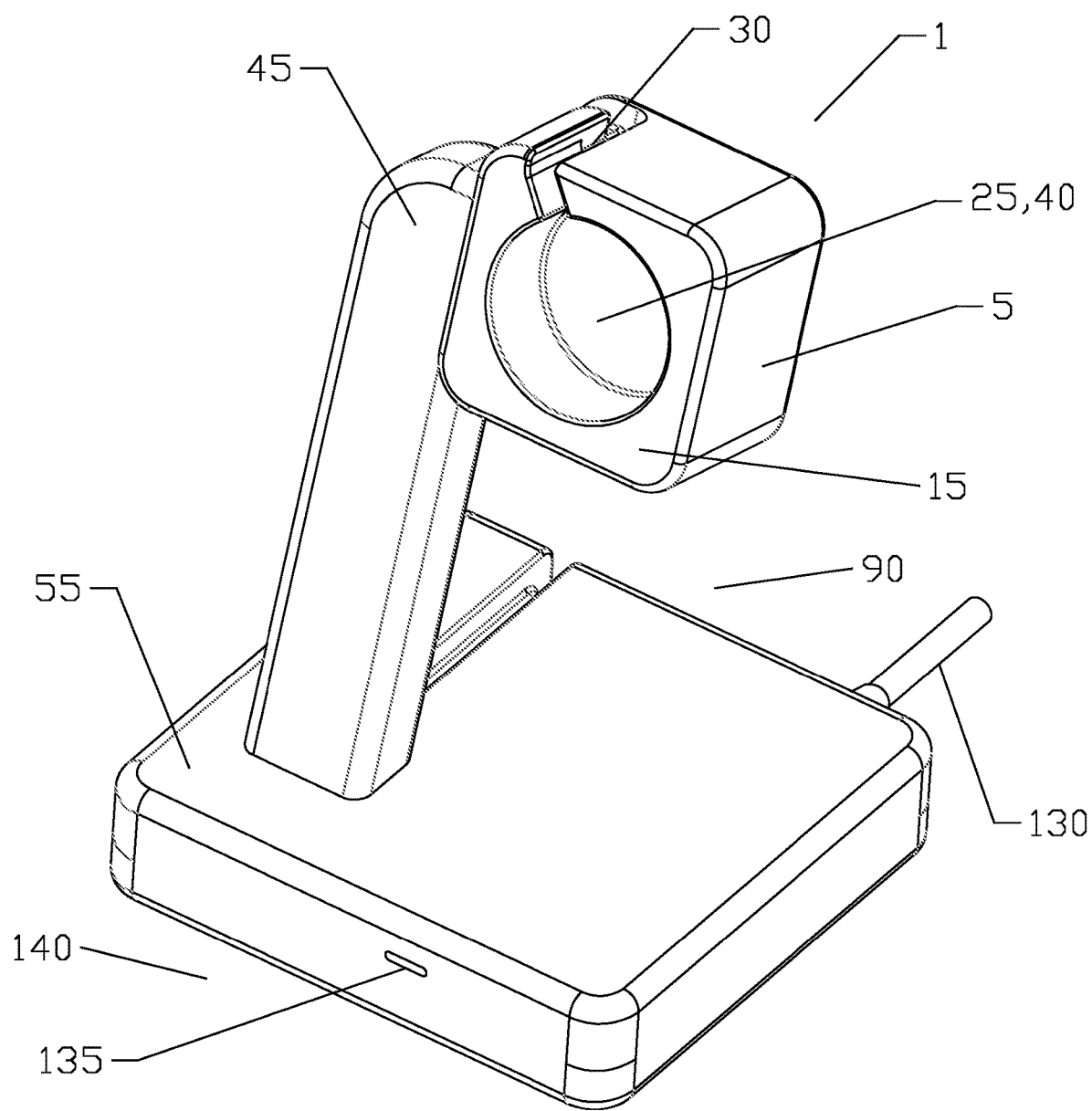
FIG. 1 is a front isometric view of an exemplary exchangeable interface charging dock with a charging element in a second position.
Figure 2:
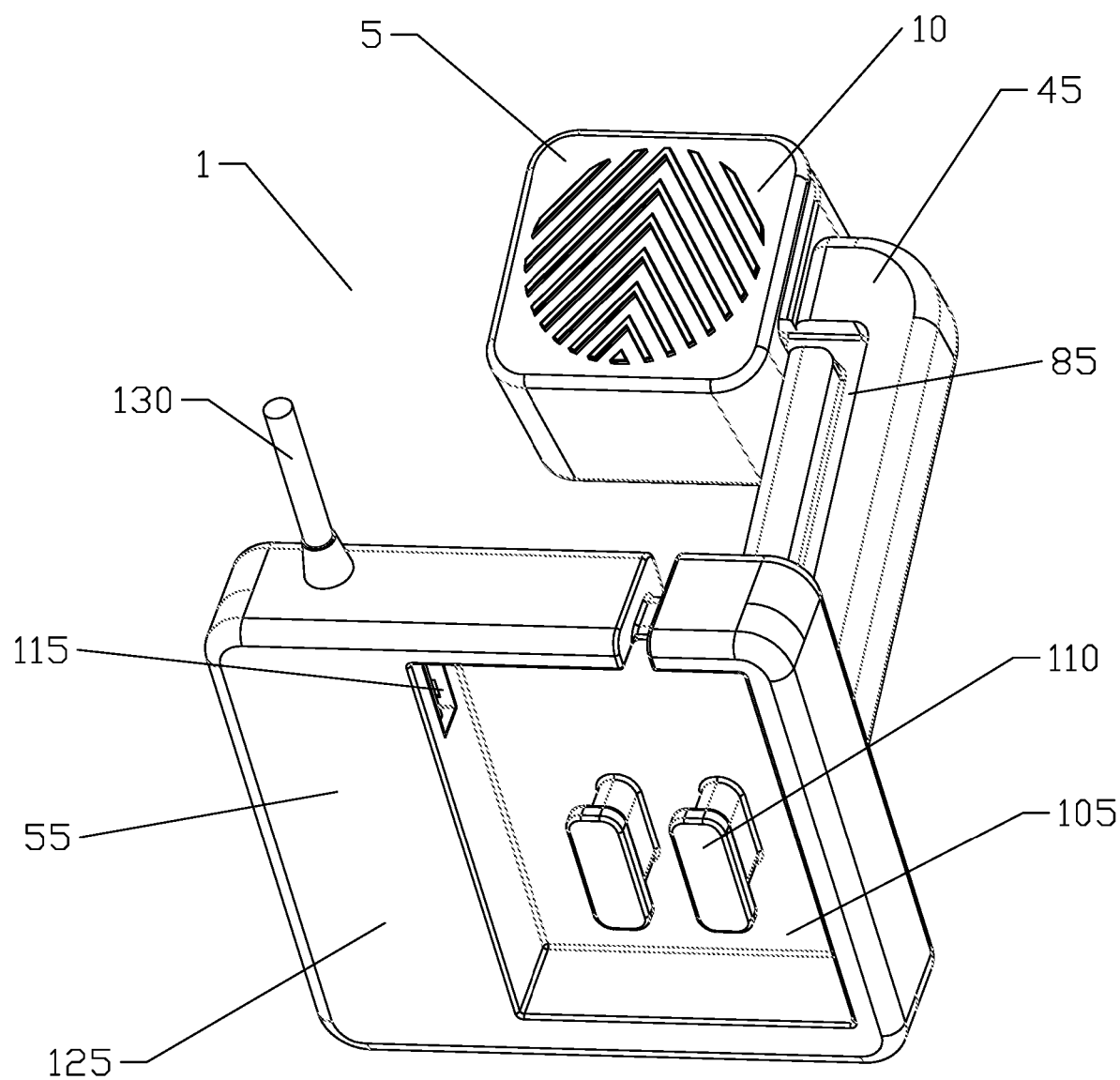
FIG. 2 is a back isometric view of the charging dock of FIG. 1, cable cavity cover removed.

As best shown in FIGS. 1 and 2, an exchangeable interface wireless charging dock 1 provides a stand 45 for wireless charging of a smart watch or the like, via a charging element 5. The stand 45 may be configured to orient the smart watch for screen viewing during charging, the smartwatch hung there from oriented so that the screen of the smartwatch is also available for viewing, for example to display the time or alarms/notifications that may be received while charging.

Figure 3:
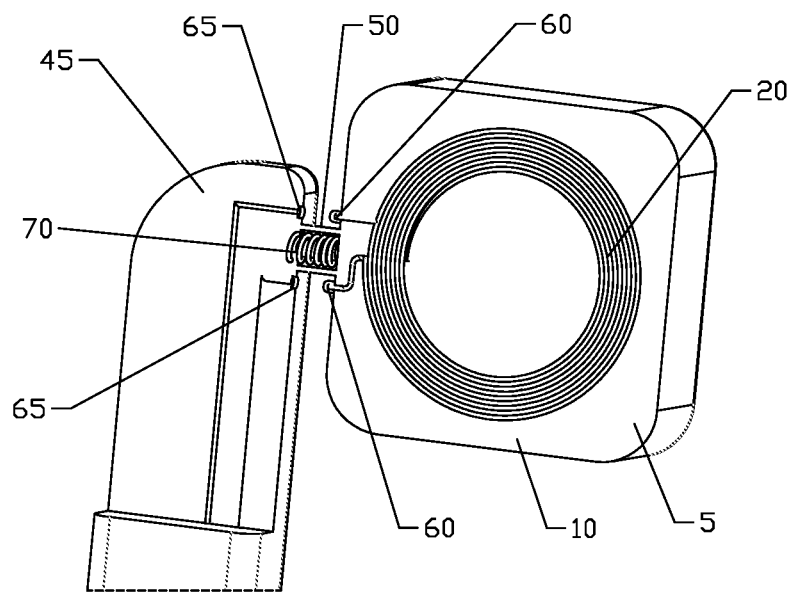
FIG. 3 is a schematic cutaway isometric view of the charging dock of FIG. 1 demonstrating electrical interconnections between the first side of the charging element and the stand.
Figure 7:
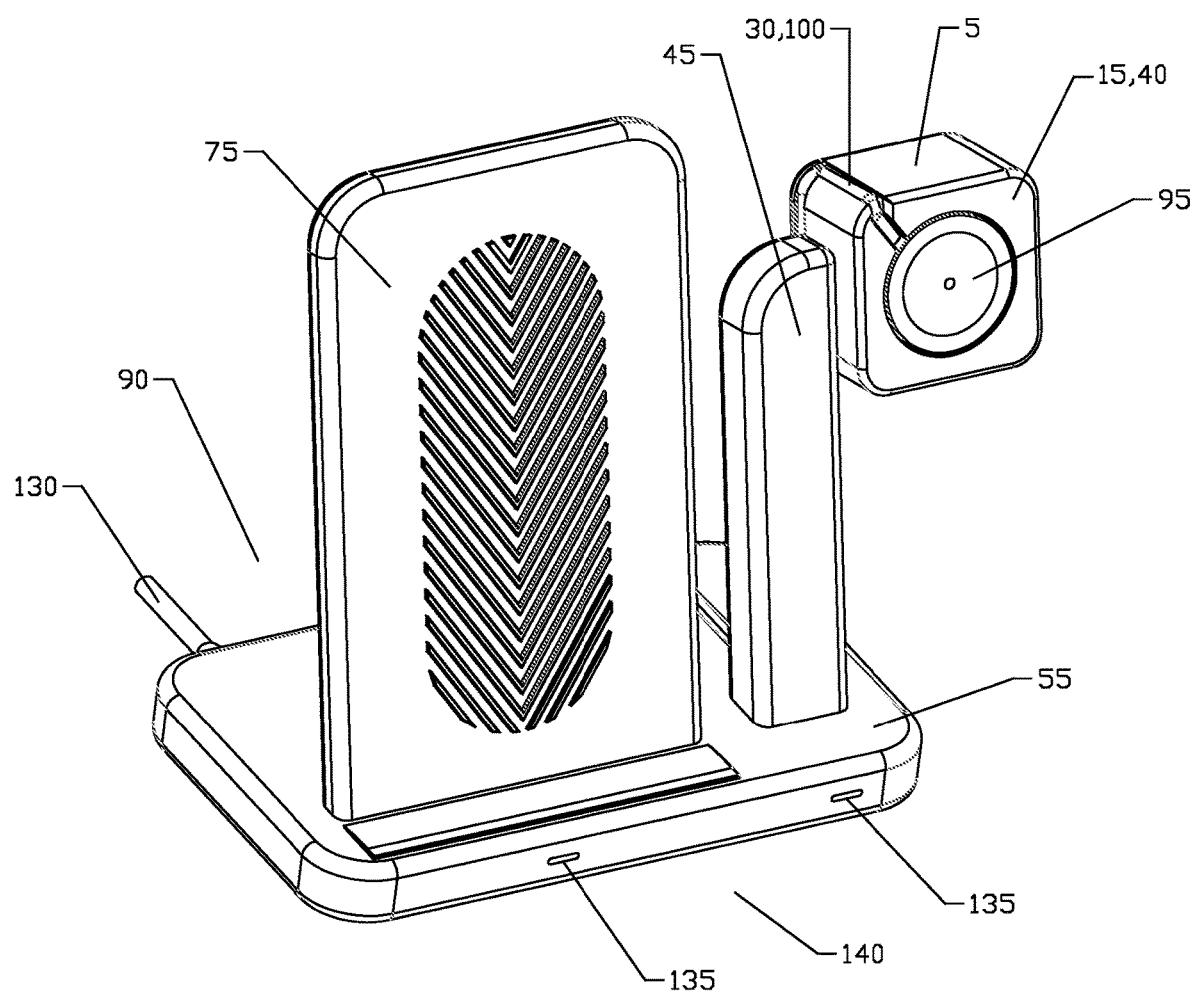
FIG. 7 is a front isometric view of the charging dock of FIG. 6, showing the wireless charger disc and charge disc cable positioned within the wireless charge cavity and cable groove, respectively.

The exchangeable interface wireless charging dock 1 has a charging element 5 with a first side 10, suitable for a first electronic device such as an Android-type smartwatch, and a second side 15, suitable for a second electronic device utilizing a proprietary charge element and cable provided by the second electronic device manufacturer, such as an Apple-type smartwatch. The first side is provided with a wireless charge coil 20 enclosed therein (see FIG. 3). The second side 15 is provided with a wireless charge cavity 25 and a cable groove 30, the wireless charge cavity 25 and the cable groove 30 dimensioned to receive a wireless charger disc 95 and a charge disc cable 100 therein, respectively (see FIG. 7).

The charging element 5 is exchangeable between a first position 35 in which the first side 10 faces forward and a second position 40 in which the second side 15 faces forward. The desired side/position is selected by pulling the charging element 5 far enough from the stand 45 for a retaining assembly such as prongs 60 of the charging element 5 to clear corresponding indents 65 provided in the stand 45. Once the prongs 60 are clear of the indents 65, the charging element 5 may swivel about a pin 50 front to back so that either the first side 10, for example, Android-type or the second side 15, for example, Apple-type wireless charging side faces forward. The pin 50 about which the charging element 5 swivels may be provided with a spring 70 or the like to bias the charging element 5 against the stand 45 and the prongs 60 into the indents 65 to secure the charging element 5 in the desired orientation.

Figure 4:
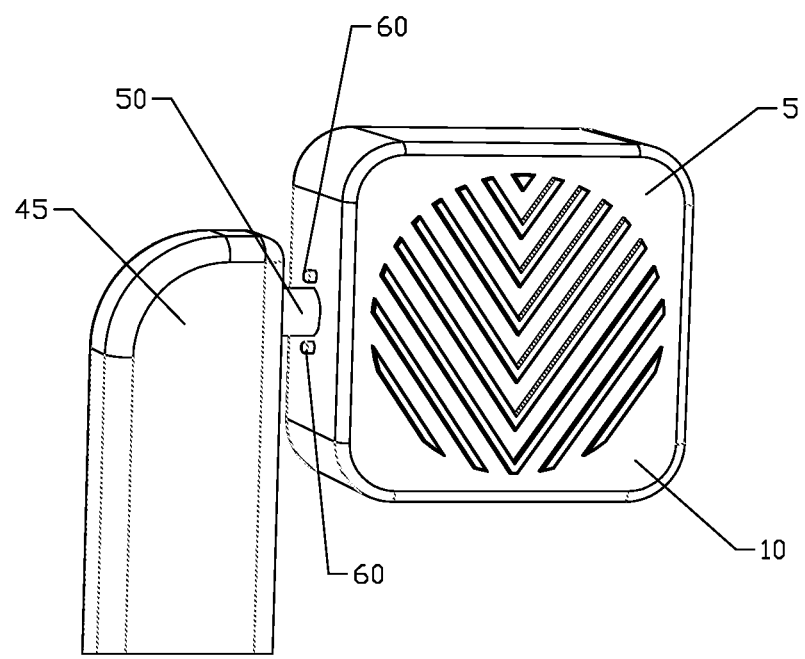
FIG. 4 is a close-up front isometric view of the charging dock of FIG. 1 showing details of the first side of the charging element while pulled away from the stand for rotation.
Figure 5:
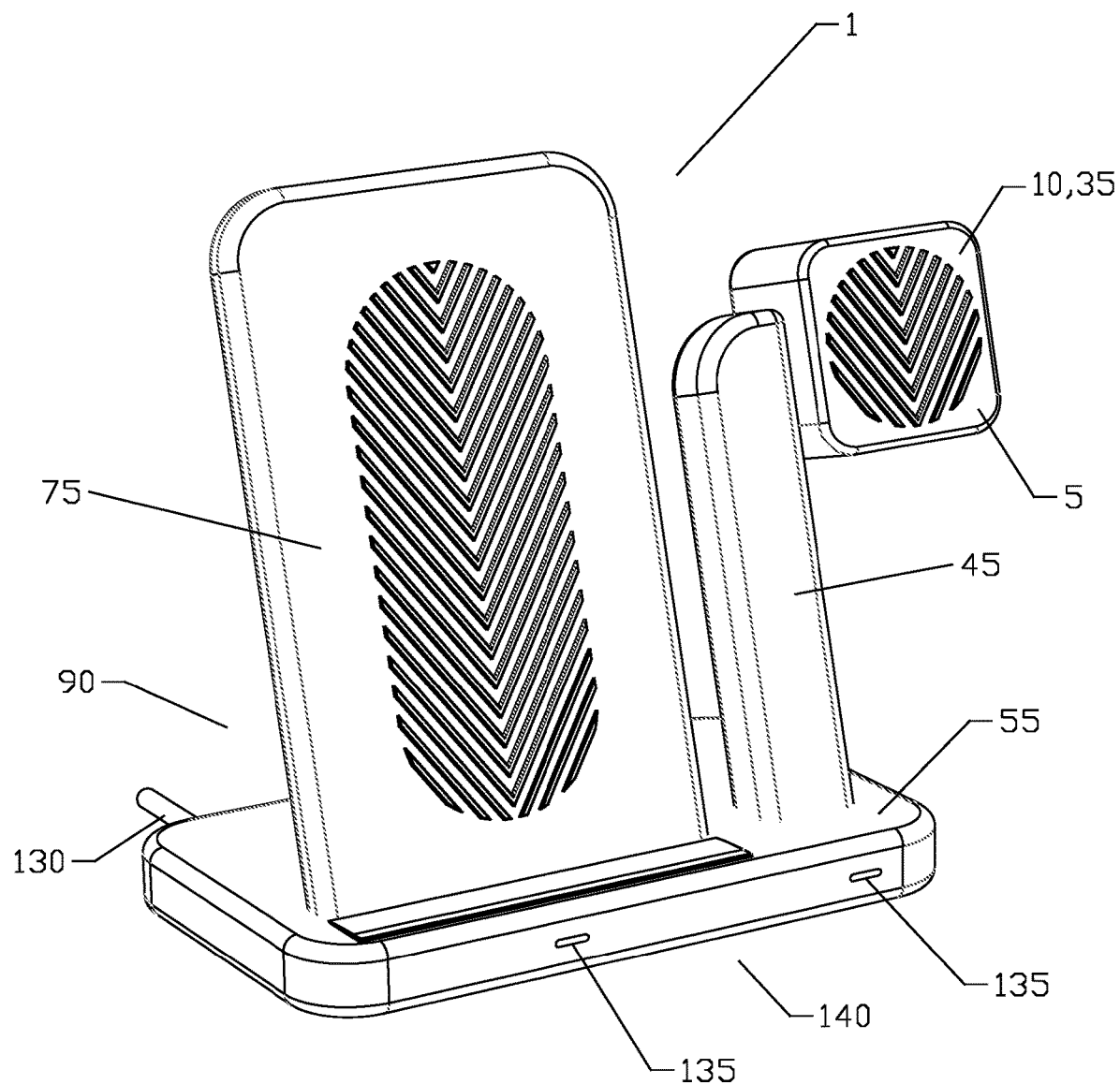
FIG. 5 is a front isometric view of an exemplary exchangeable interface charging dock including a wireless charger for a third type of electronic device, with the charging element in the first position.
Figure 6:
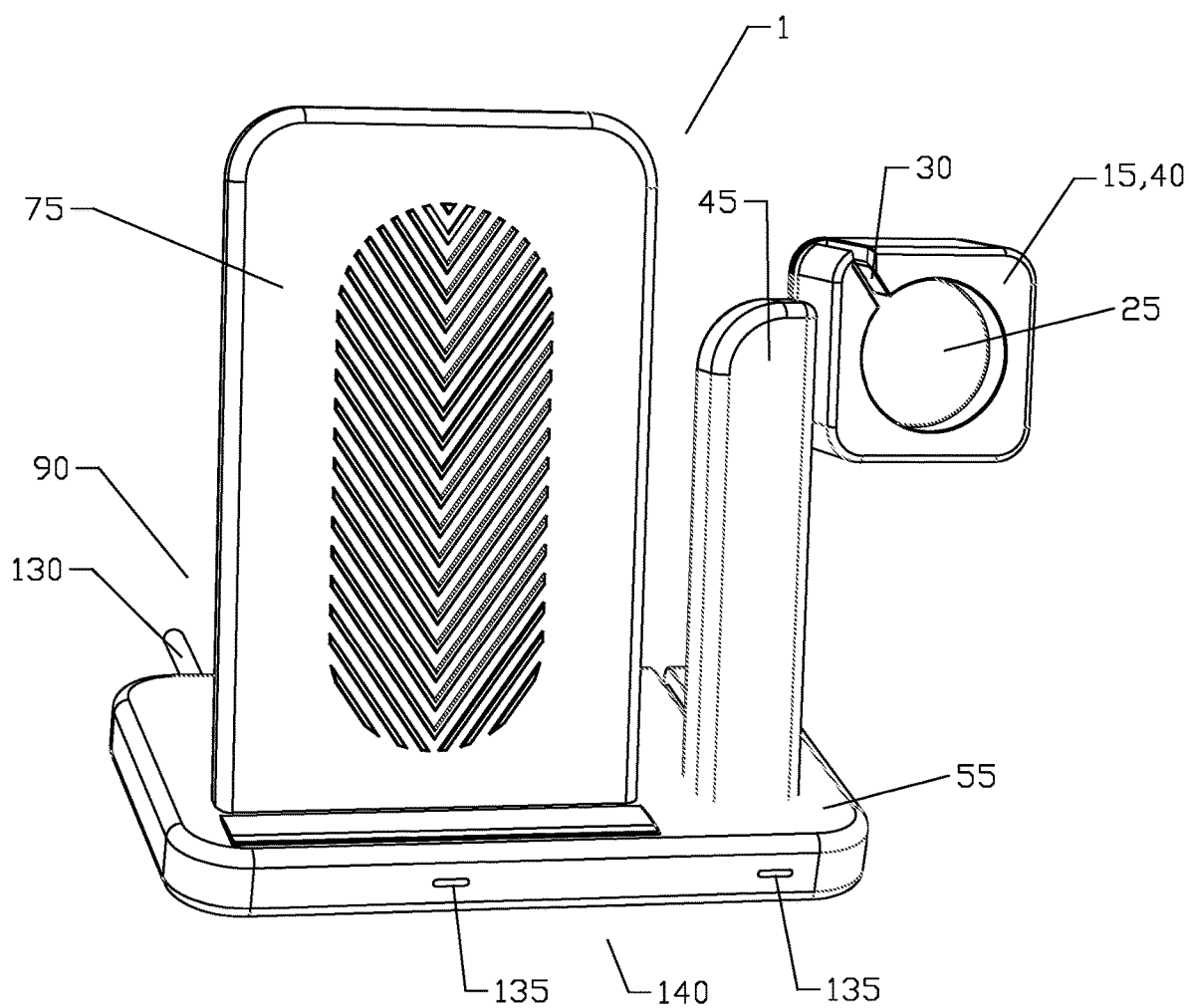
FIG. 6 is a front isometric view of the charging dock of FIG. 5 with the charging element in the second position.

The charging element 5 may be supported by a stand 45. The rotation of the charging element 5 is around a longitudinal axis of a pin 50 rotatably coupling the charging element 5 to the stand (see FIGS. 3 and 4), the stand 45 extending from a base 55. The charging element 5 has an electrical interconnection between the wireless charge coil 20 and the stand 45 via, for example, protruding prongs 60 of the charging element 5 which seat within corresponding indents 65 of the stand 45, when the charging element 5 is in the first position 35.

The charging element 5 may be biased against the stand 45 by, for example, a spring 70 which drives the prongs 60 into the indents 65 unless the charging element is extended along the pin away from the stand 45 against the spring bias for rotation. As shown in FIGS. 1 and 2, the stand 45 may be provided as an extension positioning the charging element 5 above the base 55, for example, far enough such that watch bands of the electronic device may hang freely without interfering with the base 55 while the electronic device is positioned for charging upon the charging element 5. The base 55 may further include a wireless charger for a third type of the electronic device 75, such as a mobile phone, the wireless charger for the third type of electronic device extending from the base 55, for example as shown in FIGS. 5-8.

Figure 9:
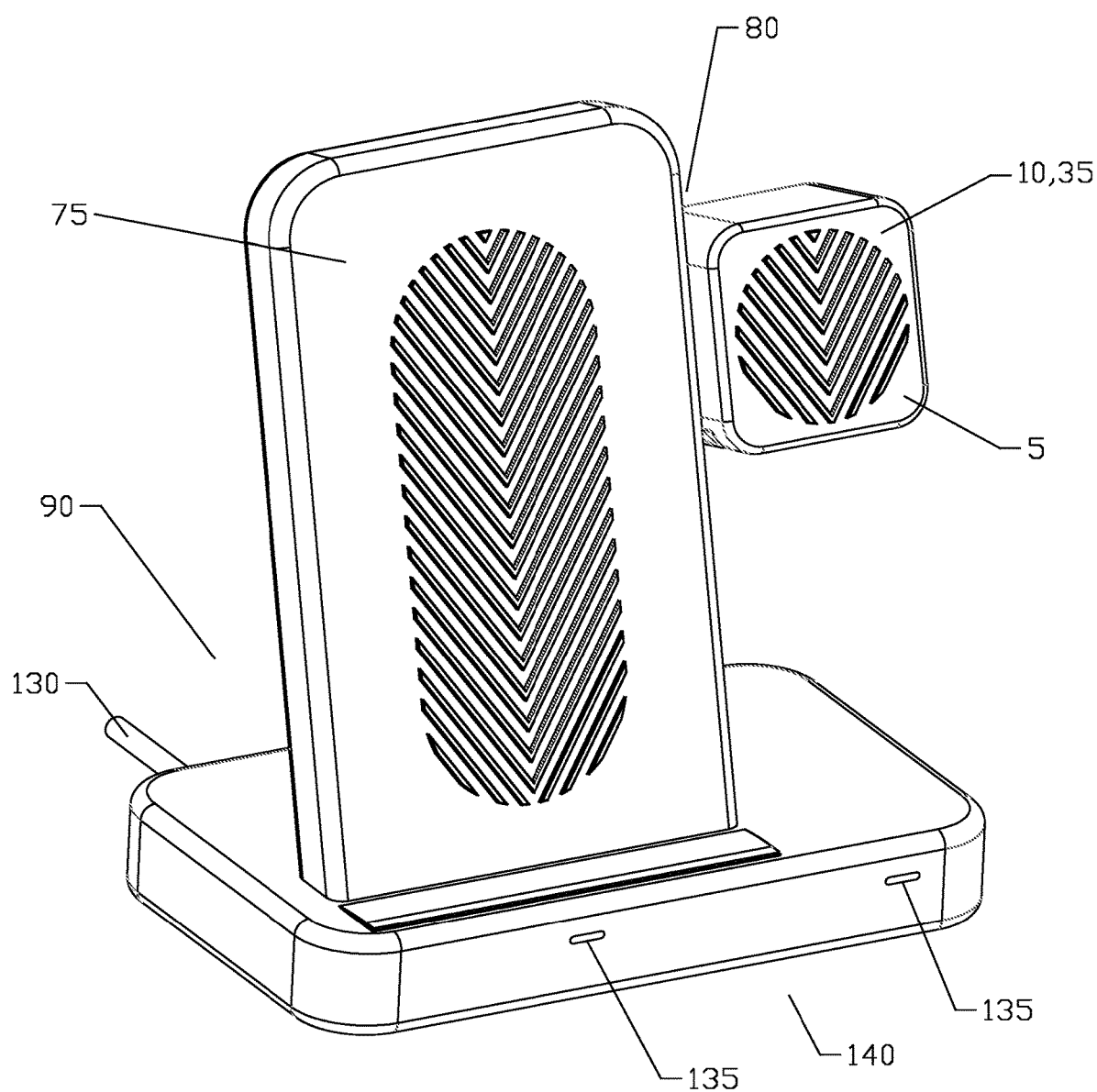
FIG. 9 is a front isometric view of an exemplary embodiment of a charging dock utilizing the sidewall of a wireless charger for third type of electronic device as the stand, the charging element demonstrated in the first position.
Figure 10:
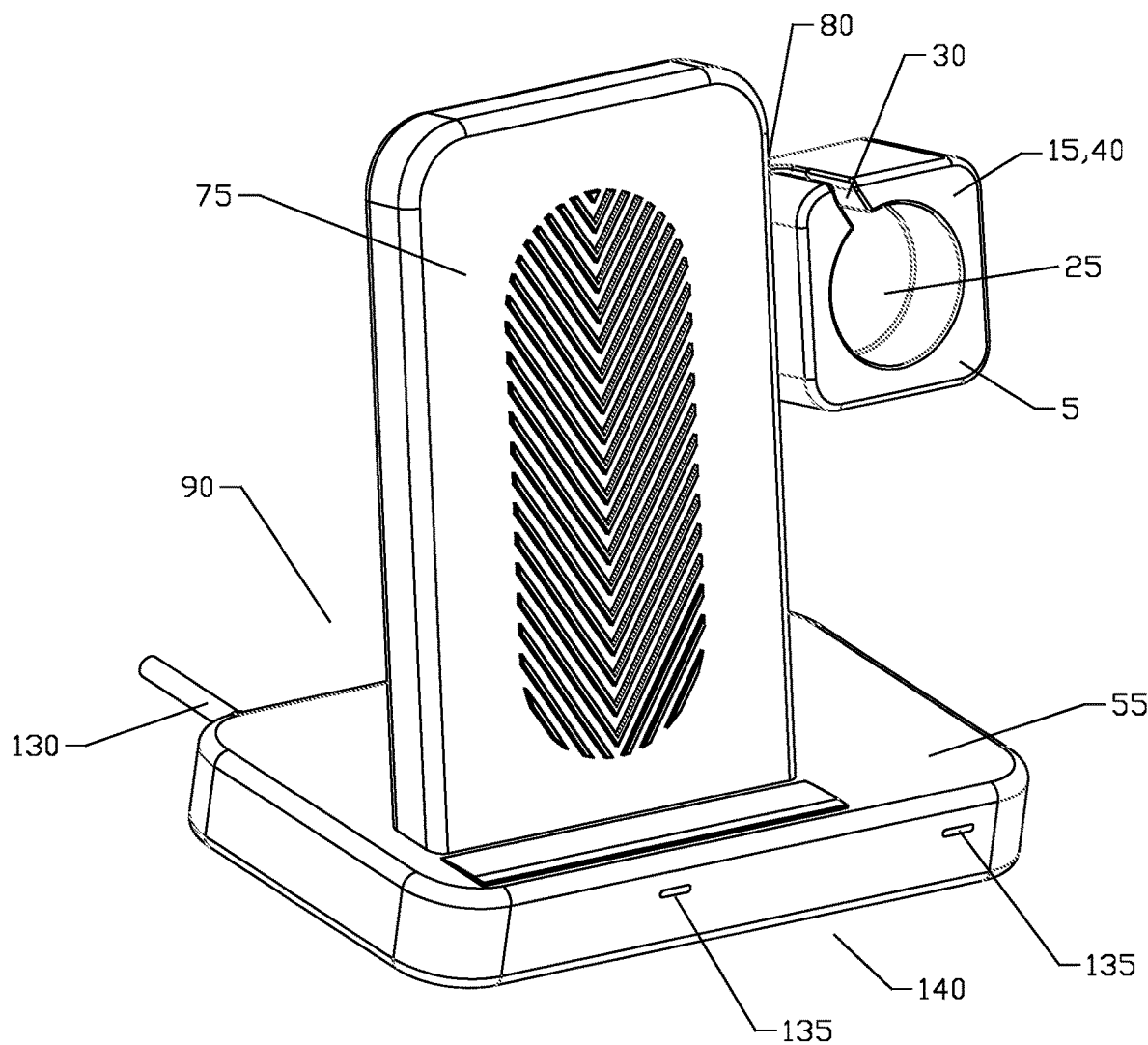
FIG. 10 is a front isometric view of the charging dock of FIG. 9, with the charging element in the second position.
Figure 11:
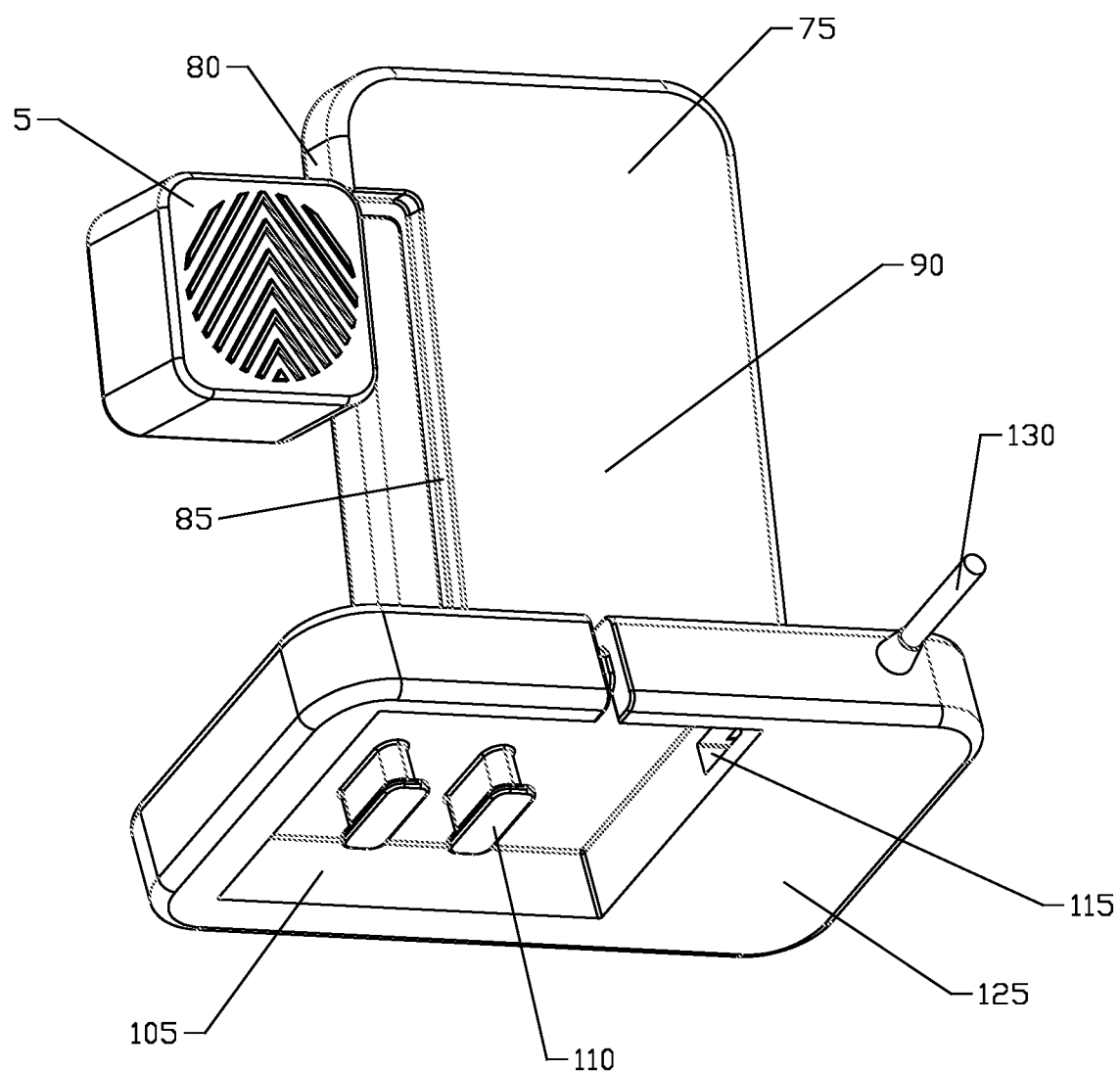
FIG. 11 is a back isometric view of the charging dock of FIG. 10, cable cover removed.

Alternatively, as best shown in FIGS. 9-11, the stand 45 may be provided as a sidewall 80 of a wireless charger for a third type of electronic device 75, the wireless charger for the third type of electronic device 75 extending from the base 55.

Figure 8:
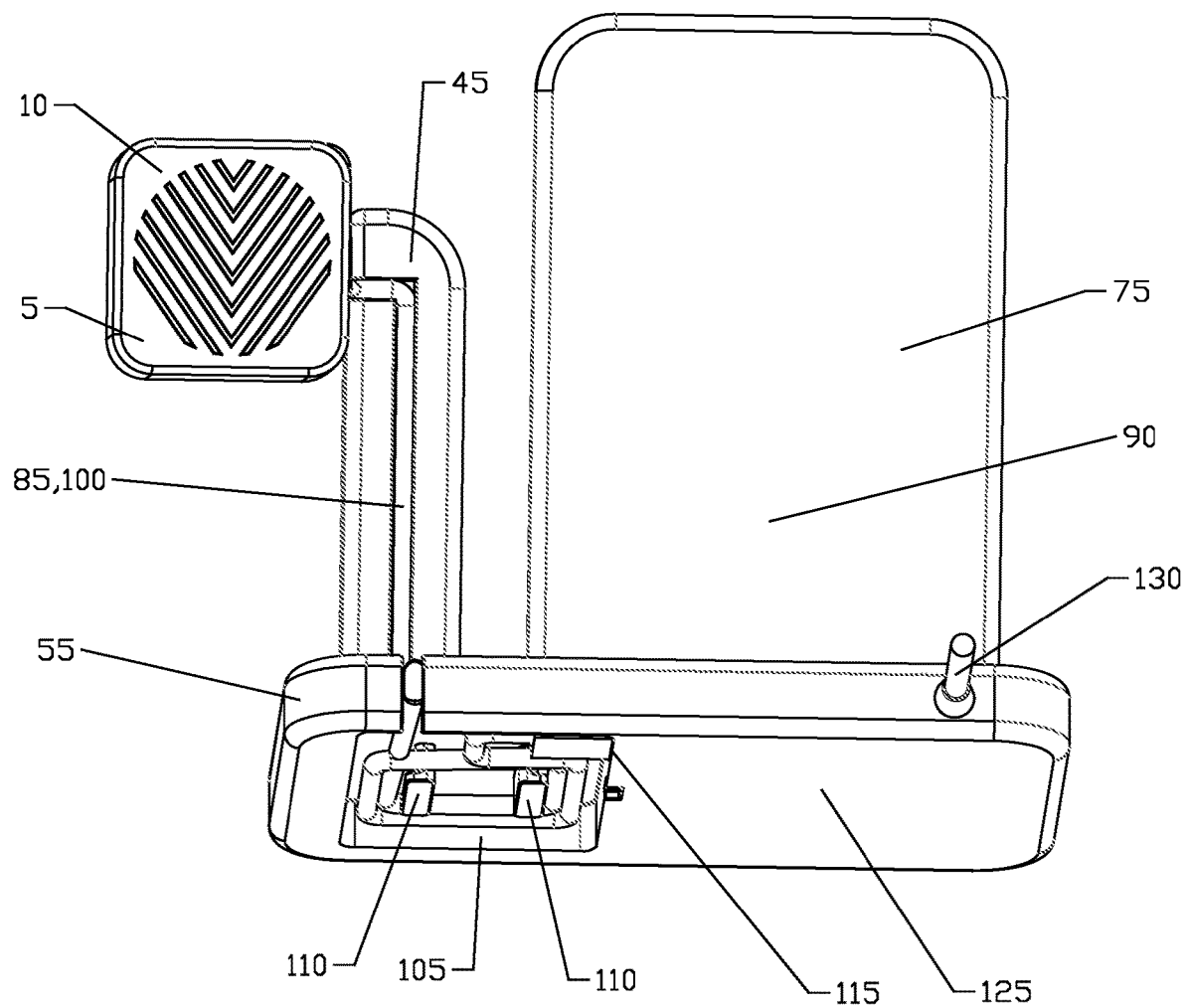
FIG. 8 is a back isometric view of the charging dock of FIG. 6, demonstrating charge disc cable routing within the stand cable groove and cable cavity, cable cavity cover open.

As shown in FIGS. 2, 8 and 11, in each of the embodiments, a stand cable groove 85 may be provided extending between proximate the charging element 5 and the base 55, on a back side 90 of the stand 45. The cable groove 30 and cable stand groove 85 together provide a path for the charge disc cable 100 to a cable cavity 105 of the base 55. Further, the cable cavity 105 may be provided with one or more cable winding posts 110 and a charge disc cable connector 115 enabling the streamlined incorporation of the wireless charger disc 95 and associated charge disc cable 100 with the exchangeable interface wireless charging dock 1. A cable cavity cover 120 dimensioned to close the cable cavity 105 may be included to further integrate the charge disc cable 110 into the assembly.

Figure 12:
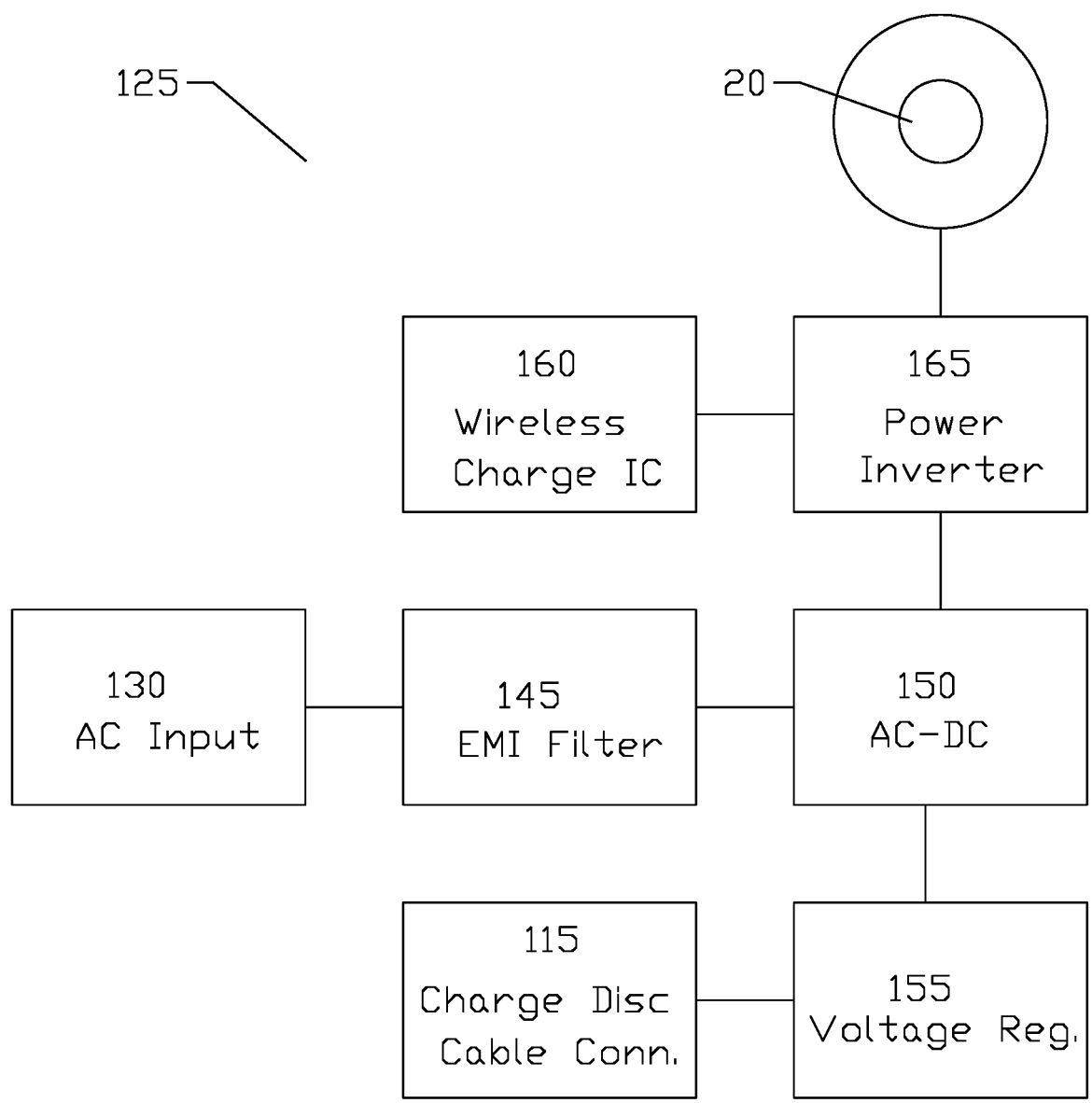
FIG. 12 is a schematic block diagram of an electrical power supply for the charging dock.

As shown in FIG. 12, a power supply 125, is energized by an alternating current power input 130, such as an AC power cord may be provided in the base 55. The power supply 125 providing power passed through an EMI filter 145 and AC-DC rectifier 150 to a voltage regulator 155 delivering DC power to the charge disc cable connector 115 as well as to a power inverter 165 coupled to the wireless charge coil 20 (under the control of a wireless charging Integrated Circuit 160) and if present, to a wireless charge coil or the like for the wireless charger for third type of electronic device 75. Thereby, a single AC power cord is utilized both for the first side 10 and the second side 15 of the charging element 5 and also for the wireless charger for third type of electronic device 75, if present. The power supply 125 may also include visual indicia 135, such as charger status LED indicators, provided, for example, in a front side 140 of the base 55.

In further embodiments, both the Android-type and the Apple-type charging elements may be fully integrated into the second side 15 of the charging element 5. Although incorporating an Apple-type charging element into the product increases manufacturing costs, it eliminates cable issues resulting in a sleeker appearance and simplified configuration requirements for the user.

One skilled in the art will appreciate that the exchangeable interface charging dock 1 provides manufacturers with a single SKU to fabricate and inventory and consumers with a single product capable of charging the majority of modern smart phone and smartwatch combinations in a compact easy to use assembly requiring only a single power cord.

One skilled in the art will appreciate that the exchangeable wireless charging dock 1 enables a single charger to be usable with both Android-type and Apple-type devices.

| | Table of Parts |
|---|---|
| 1 | Exchangeable interface charging dock |
| 5 | Charging element |
| 10 | First side |
| 15 | Second side |
| 20 | Wireless charge coil |
| 25 | Wireless charge cavity |
| 30 | Cable groove |
| 35 | First position |
| 40 | Second position |
| 45 | Stand |
| 50 | Pin |
| 55 | Base |
| 60 | Prong |
| 65 | Indent |
| 70 | Spring |
| 75 | Wireless charger for third type of electronic device |
| 80 | Sidewall |
| 85 | Stand cable groove |
| 90 | Backside |
| 95 | Wireless charger disc |
| 100 | Charge disc cable |
| 105 | Cable cavity |
| 110 | Cable winding post |
| 115 | Charge disc cable connector |
| 120 | Cable cavity cover |
| 125 | Power supply |
| 130 | Alternating current power input |
| 135 | Visual indicia |
| 140 | Front side |
| 145 | EMI filter |
| 150 | AC-DC |
| 155 | Voltage regulator |
| 160 | Wireless Charge Integrated Circuit |
| 165 | Power Inverter |

Where in the foregoing description reference has been made to materials, ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

The invention claimed is:

1. A wireless charging dock, comprising:
   a charging element with a first side and a second side;
   the first side provided with a wireless charge coil;
   the second side provided with a wireless charge cavity and a cable groove, the wireless charge cavity and the cable groove dimensioned to receive a wireless charger disc and a charge disc cable therein, respectively;
   the charging element rotatable between a first position in which the first side is oriented to receive a first type of electronic device for wireless charging and a second position in which the second side is oriented to receive a second type of electronic device for wireless charging.

2. The wireless charging dock of claim 1, further including a stand supporting the charging element; the rotation of the charging element is around a longitudinal axis of a pin rotatably coupling the charging element to the stand, the stand extending from a base.

3. The wireless charging dock of claim 2, further including an electrical interconnection between the wireless charge coil and the stand.

4. The wireless charging dock of claim 3, wherein the electrical interconnection is via protruding prongs of the charging element which seat within corresponding indents of the stand, when the charging element is in the first position.

5. The wireless charging dock of claim 2, wherein the charging element is extendable along the pin, away from the stand, for rotation.

6. The wireless charging dock of claim 5, wherein the charging element is biased against the stand by a spring.

7. The wireless charging dock of claim 2, further including a wireless charger for a third type of electronic device, the wireless charger for the third type of electronic device extending from the base.

8. The wireless charging dock of claim 2, further including a stand cable groove extending between proximate the charging element and the base, on a back side of the stand.

9. The wireless charging dock of claim 8, further including a cable cavity within the base.

10. The wireless charging dock of claim 9, further including a cable winding post in the cable cavity.

11. The wireless charging dock of claim 9, further including a cover dimensioned to close the cable cavity.

12. The wireless charging dock of claim 9, further including a charge disc cable connector in the cable cavity.

13. The wireless charging dock of claim 2, wherein the stand is a sidewall of a wireless charger for a third type of electronic device, the wireless charger for the third type of electronic device extending from the base.

14. The wireless charging dock of claim 13, further including a stand cable groove extending between proximate the charging element and the base, on a back side of the third type of electronic device.

15. The wireless charging dock of claim 14, further including a cable cavity within the base.

16. The wireless charging dock of claim 15, further including at least one cable winding post in the cable cavity.

17. The wireless charging dock of claim 15, further including a cover dimensioned to close the cable cavity.

18. The wireless charging dock of claim 15, further including a charge disc cable connector in the cable cavity.

19. The wireless charging dock of claim 2, further including an alternating current power input of the base coupled to a power supply of the base which provides power to a charge disc cable connector in a cable cavity of the base and power to drive the wireless charging coil.

20. The wireless charging dock of claim 19, further including visual indicia of a charger status on a front side of the base.

* * * * *